United States Patent [19]
Bishop et al.

[11] Patent Number: 5,390,408
[45] Date of Patent: Feb. 21, 1995

[54] SLOTTING

[75] Inventors: Arthur E. Bishop, Sydney; Klaus J. Roeske, Lugarno; John Baxter; Lyle J. McLean, both of Sydney, all of Australia

[73] Assignee: A.E. Bishop & Associates Pty. Limited, North Ryde, Australia

[21] Appl. No.: 50,244
[22] PCT Filed: Apr. 10, 1992
[86] PCT No.: PCT/AU92/00158
  § 371 Date: May 11, 1993
  § 102(e) Date: May 11, 1993
[87] PCT Pub. No.: WO92/18277
  PCT Pub. Date: Oct. 29, 1992

[30] Foreign Application Priority Data
  Apr. 12, 1991 [AU] Australia ............... PK 5592

[51] Int. Cl.⁶ ............ B23P 13/00; B21D 53/00
[52] U.S. Cl. ............... 29/558; 29/890.132; 409/244; 409/293
[58] Field of Search ........... 29/38 B, 47, 33 R, 558, 29/890.12, 890.126, 890.128, 890.132; 409/131, 251, 244, 293

[56] References Cited

U.S. PATENT DOCUMENTS

| | | | |
|---|---|---|---|
| 1,952,194 | 3/1934 | Drissner | 409/244 |
| 2,918,849 | 12/1959 | Campbell | 409/7 |
| 3,259,019 | 7/1966 | Bibbens | 409/59 |
| 4,244,668 | 1/1981 | Demuth | 409/46 |
| 4,519,125 | 5/1985 | Colonius et al. | 29/33 T X |
| 4,535,519 | 8/1985 | Kajikawa et al. | 29/890.132 |
| 4,554,817 | 11/1985 | Dier | 29/890.12 |
| 4,689,864 | 9/1987 | Fukuma et al. | 29/890.12 |
| 4,768,268 | 9/1988 | Ishihara et al. | 29/890.132 |

FOREIGN PATENT DOCUMENTS

| | | | |
|---|---|---|---|
| 106297 | 1/1939 | Australia . | |
| 124241 | 5/1947 | Australia . | |
| 150346 | 6/1952 | Australia . | |
| 454207 | 9/1970 | Australia . | |
| 511581 | 6/1978 | Australia . | |
| 14107 | 8/1980 | European Pat. Off. | 29/558 |
| 0393894 | 10/1990 | European Pat. Off. . | |
| 3420558 | 12/1984 | Germany . | |
| 137533 | 8/1983 | Japan | 29/890.132 |
| 210339 | 10/1985 | Japan | 29/890.12 |
| 173807 | 8/1986 | Japan | 409/259 |
| 234126 | 8/1989 | Japan | 409/244 |
| 9219404 | 11/1992 | WIPO | 409/259 |

OTHER PUBLICATIONS

"Back End Work", pp. 12–14, *Automatic Machining*, Jul. 1972.
PCT/US90/02402, Published Nov. 15, 1990.

*Primary Examiner*—William Briggs
*Attorney, Agent, or Firm*—Nikaido, Marmelstein, Murray & Oram

[57] ABSTRACT

Apparatus for machining an angularly disposed array of slots (FIG. 7) concentric with the axis (85) of a bore of a valve sleeve (1) which has a sleeve holder (3) which is rotatably indexed for locating the arcuate position of each slot of the array, a cutting tool (5) positioned on the apparatus to cut a slot in the bore of the sleeve at each indexed location and a boring device (80, 81, 82, 83, 90) for forming the bore co-axially with the array of slots; the operation of the cutting tool (5) and boring device (80, 81, 82, 83, 90) taking place while the sleeve (1) is mounted in the one orientatioln in the holder (3).

16 Claims, 6 Drawing Sheets

SLOTTING

This invention relates to a method and apparatus for manufacturing a plurality of parallel, longitudinally extending slots in the bore of a component. One example of such a component is the sleeve element of an automotive rotary power steering valve in which the slots are usually blind-ended and form a series of hydraulic ports circumferentially spaced within the sleeve bore, and which operate, in conjunction with similar circumferentially spaced ports in a co-acting cylindrical input-shaft element housed within the sleeve, upon slight relative rotation between these components. The present invention will be in particular reference to such sleeves even though it will be understood that it has wider application in the manufacture of parallel, longitudinally extending internal slots in the bore of components generally.

The prior art which is most closely related to that of the present invention is disclosed in U.S. Pat. No. 4,154,145 (Bishop) and Australian Provisional Patent Application PK3520 (Bishop). These so called "slotting machines" machine the slots in the bore of power steering valve sleeves. The design of these machines calls for each of the slots to be scooped out of the bore of a turned blank by a finger-like cutting tool mounted in a cutting spindle which angularly reciprocates about an axis in a series of progressively deeper cutting and return strokes so forming a closed chamber, or hydraulic port, which is arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6 or 8 slots for most automotive applications.

Many rotary power steering valves today are incorporated in firewall-mounted rack and pinion steering gears and, in this situation, any noises emanating from the valve are very apparent to the driver due to the required relatively rigid mounting of the steering gear and its proximity to the driver. However, even in the case of the more remotely located cross-member-mounted rack and pinion steering gears, or indeed the classical recirculating ball-nut steering boxes, valve noise can be transmitted up the steering shaft and therefore still be audible to the driver. The type of valve noise of greatest concern to the rotary valve designer is the "hiss" resulting from cavitation of the hydraulic oil as it flows through the axially extending array of control orifices in the valve. These orifices are formed by the interaction of adjacent sets of input-shaft metering edges and sleeve slot edges, and therefore open and close when relative rotation occurs between the input-shaft and sleeve. The orifices are ported as a network such that they form sets or arrays of hydraulic Wheatstone bridges which act essentially in parallel. Hiss is particularly evident during times of high pressure operation of the valve such as during parking manoeuvres.

It has been found that hiss is significantly reduced in rotary valves if the various input-shaft metering edges are manufactured extremely precisely so that oil flow in the sets or arrays of hydraulic Wheatstone bridges is distributed equally between them, so avoiding instances where the flow density per unit length of metering edge greatly exceeds the mean overall value, with consequent triggering of violent turbulent flow and hence cavitation. Such "feather" form metering edges, for example those described in U.S. Pat. No. 4,460,016 (Haga), are frequently ground to a fine depth and angular index tolerance in order to achieve this end. However, as referred to earlier, the hydraulic orifices in a rotary valve are equally determined by the angular position of the sleeve slot edges.

Therefore refinements in the design and the manufacture of the sets of input-shaft metering edges are totally wasted if the sets of corresponding sleeve slot edges are inaccurately spaced. In fact it has been shown in experiments that the accuracy of the angular spacing of the sleeve slot edges is equally important compared to the accuracy of the input-shaft metering edges in determining the level of valve noise.

The slotting process inherently produces an array of slots in the sleeve that are angularly displaced with very high accuracy due to the fact that all slots are cut by the same cutting tool, and that indexation is achieved by a relatively large diameter master index wheel mounted directly to the work holding spindle.

However the effective centre of this array of slots is often eccentric with respect to the sleeve outside diameter, primarily due to run-out in the work holding collet and location irregularities caused by non-uniformity of gripping and out-of-roundness of the sleeve outside diameter. This problem is usually exacerbated by distortion of the sleeve during subsequent heat treatment operations and the introduction of further eccentricities of a similar nature associated with re-colleting the hardened sleeve on its now distorted outside diameter in the spindle of an internal grinding machine and finish grinding its inside diameter. Depending on the actual details of the processing, these errors can typically combine to produce up to 0.05 mm eccentricity between the effective centre of the array of slots and the finished sleeve inside diameter, resulting in correspondingly large sinusoidally varying angular errors in the disposition of the sleeve slot edges with respect to the sleeve inside diameter. For example, assuming a typical 20 mm inside diameter automotive sleeve bore, the above 0.05 mm eccentricity will cause a sinusoidally varying sleeve slot error with a maximum amplitude of 0.3 degrees.

Irrespective of the accuracy of the input-shaft metering edges, such sleeve slot edge errors significantly imbalance the oil flow in the parallel hydraulic Wheatstone bridge network in the rotary valve, so causing some orifices to have greatly increased flow density per unit length of metering edge compared to others, and therefore causing oil cavitation and valve hiss at high operating pressures. Least maximum flow densities will occur if all edges which act in parallel approach the close-off position simultaneously.

Numerous alternative manufacturing methods exist for sleeves apart from the processing described above and, almost invariably, lead to even larger eccentricities of the effective centre of the array of sleeve slots with respect to the sleeve inside diameter. For example sleeves of the type shown in U.S. Pat. Nos. 3,022,772 (Zeigler) and 4,454,801 (Spann) and are manufactured by simultaneously multi-tooth broaching all the slots, hardening, pressing in two stop rings re-axially seal the slots and subsequently grinding and/or honing the inside diameter. Sleeves of the type described in US Patent 4,614,014 (Ferguson) are similarly broached, however the ends of the slots are axially sealed by cold swaging prior to hardening. When broaching such sleeve slots, it is difficult to control the radial run-out of the multi-tooth broach tool as it progressively machines through the sleeve bore and, hence, again usually produces a large eccentricity of the effective centre of the array of sleeve slots with respect to the sleeve bore. Moreover the insertion of the stop rings or, alternatively, the swaging operation, further deforms and internally stresses the sleeve material over and above that associated with the hardening process.

In still further alternative manufacturing methods for sleeves, the slots are produced by inserting a mandrel into a cup shaped sleeve blank. In the method described in U.S. Pat. No. 4,535,519 (Kajikawa et al.) the mandrel has a multi-tooth cutting edge and cuts all the slots in a single plunge of the mandrel, followed by axially sealing the open ends of the slots by cold swaging. In another method described in U.S. Pat. No. 4,768,268 (Ishihara et al.) the mandrel is fluted and cold coins the slots prior to withdrawal of the mandrel and cold swaging. In still another method described in U.S. Pat. No. 4,762,302 (Bandou et al.) the mandrel houses radially extending coining dies which cold coin an array of blind ended slots.

All the abovementioned alternative sleeve manufacturing methods have distinct disadvantages compared to slotting in so far as their ability to produce accurately disposed slot edges within the finished sleeve bore. Firstly, they all involve introducing additional internal stress into the sleeve material which results in uncontrollable deformation, particularly due to the stress relieving action inherent in subsequent hardening operations. Secondly, each slot is essentially produced by a different tool or a different element on one tool, whether this tool actually cuts or cold deforms. Hence, unlike slotting, the angular disposition of the edges of the slots is totally a function of the accuracy of the array of flutes or cutting edges on a very small tool and of their individual widths, rather than the teeth of a much larger precision ground index wheel and the fact that the cutting of all slots is by a single tool as in the case of slotting machines. Thirdly, and most importantly, with these alternative processes it is virtually impossible to maintain concentricity between the effective centre of the array of slots and the finished sleeve bore. Broach tools, as well as the various described configurations of mandrels, all "drift" sideways during forming or cutting of the sleeve slots and hence the final array of slots is not accurately located in relation to either the inside, or indeed the outside, diameter of the sleeve.

However, as has been described, manufacturing sleeves according to prior art slotting processes does not completely eliminate the problem associated with this third mentioned disadvantage, and the array of slots, although almost perfectly angularly disposed within itself, can have a centre which is typically up to 0.05 mm eccentric with respect to the finished sleeve bore.

The essence of the present invention is therefore to arrange to machine the array of slots concentric with the finished bore, with the aim of at least substantially reducing the abovementioned source of eccentricity and hence enable the manufacture of slotted sleeves with slot edges near perfectly angularly disposed within the finished sleeve bore, by a method and means such that the required small angular tolerance on the disposition of slots within the sleeve, achieved by the earlier referred to accurate indexing, is maintained irrespective of run-out errors arising from either imperfect colleting of the sleeve in the workholding spindle or imperfect workholding spindle bearing supports.

The present invention therefore consists in a method for machining an angularly disposed array of parallel longitudinally extending slots in the bore of a component comprising the steps of firstly gripping said component in a workholding device mounted to an indexable workholding spindle, secondly machining said bore of said component, thirdly cutting said array of slots in said bore by a series of progressively deeper cutting strokes of a cutting tool, the cutting of each slot being followed by indexation of said workholding spindle, or alternatively interposing said third step prior to said second step, in either case said cutting of said array of slots being carried out while the component remains gripped in said workholding device in the same location and orientation as during said machining of said bore to thereby maintain the centre of the array of said cut slots colinear with the axis of said bore irrespective of the location and orientation of the component in the workholding device.

Since the sleeve is slotted in the same collet location as it is bored, any eccentricities associated with rotation of the work holding spindle or the integrity of the gripping of the collet on the outside diameter of the sleeve are removed. For this processing method to be feasible, it is preferred that the sleeve is not removed from the collet after boring so that subsequent replacement in the collet prior to slotting (or vice versa) is avoided. If this was not the case, it would be extremely difficult to ensure that the respective sleeve locations within the collet were identical and hence eccentricities would be introduced between the finished bore and the array of slots. For this reason, intermediate operations on the sleeve outside the "boring/slotting machine" are not feasible if the maximum benefits of the process are to be achieved. Such intermediate operations could include for example induction hardening or carburising, or drilling of porting holes for hydraulic connection to the array of slots within the sleeve.

The preferred process for finish machining the bore of sleeves produced by the boring/slotting process is honing, whether the sleeve is made of a material not requiring further heat treatment such as certain steels or fine grain cast irons, or even when made of conventional sleeve materials requiring carburisation or induction hardening. Honing is ideally suited to producing a super fine surface finish in the sleeve bore and, moreover, has been shown in experiments to remove the small burrs on the slot edges which protrude radially into the bore after slotting. The major advantage of honing however, is that the honing tool is guided by its contact with the inside diameter of the sleeve, already established concentric with the array of slots by the boring/slotting process. The finished honed bore of the sleeve is therefore completely concentric with the centre of the array of sleeve slots. This cannot be achieved by finish grinding of the bore, as the sleeve must be removed from the slotting/boring machine and re-colleted or chucked in a grinding machine, thereby reintroducing eccentricity error. As has already been noted, honing is used as a finishing operation with some of the various alternative sleeve manufacturing processes, however this particular advantage is wasted since the honing tool follows a sleeve bore which is inherently eccentric with respect to the centre of the array of sleeve slots. Alternative methods of finishing the sleeve bore whilst maintaining concentricity with the centre of the array of sleeve slots include diamond sizing and lapping.

Of course most of the advantages of the boring/slotting process will also result if, rather than the work holding spindle rotating during the boring operation and the sleeve being machined with a non-rotating boring bar, the work holding spindle remains stationary and the sleeve is machined with a rotating boring bar. Naturally it is essential that the axis of the rotating boring bar is accurately aligned colinearly with the axis of the work holding spindle. Any offset distance between these axes will directly reflect as an eccentricity between the sleeve bore and the centre of the array of sleeve slots. However, all of the previously detailed advantages relating to the lack of need to recollet the sleeve between slotting and boring operations will be preserved, as in the case of the preferred embodiment.

In yet another option, both the work holding spindle and the boring bar can simultaneously rotate during the boring operation. Preferably they would be designed to rotate in opposite directions to maximise the rate of metal removal. Depending upon their relative rotational velocities and the axial feedrate of the boring bar (per revolution) an axially disposed surface finish in the bore of the sleeve in the form of a sine wave will be produced with an amplitude equal to twice the distance between the axes of rotation of the work holding spindle and the boring bar. This "wavey" bore form however will be perfectly concentric with the centre of the array of sleeve slots and hence, during subsequent honing, diamond sizing or lapping, the tool will follow the "maximum material condition form" (that is, the radially inner most crests of the waves) and result in perfect concentricity between the array of sleeve slots and the finished sleeve bore. One advantage of this arrangement is that, whereas the boring bar may readily be journalled to rotate at very high speeds the cutting spindle and index mechanism is not readily adapted to high speed rotation.

In another aspect the present invention consists in apparatus for machining an angularly disposed array of parallel longitudinally extending slots in a bore of a component, said apparatus comprising means for gripping said component in a workholding device mounted to an indexable workholding spindle, boring means for boring said component while gripped by said gripping means and slotting means for cutting an array of slots within the bore, wherein said boring means and said slotting means are operable while the component is continuously gripped within the gripping means to thereby maintain the centre of the array of said cut slots colinear with the axis of said bore irrespective of the location and orientation of the component in the workholding device.

The present invention will now be described by way of example with reference to the accompanying drawings, in which.

Figure 1:
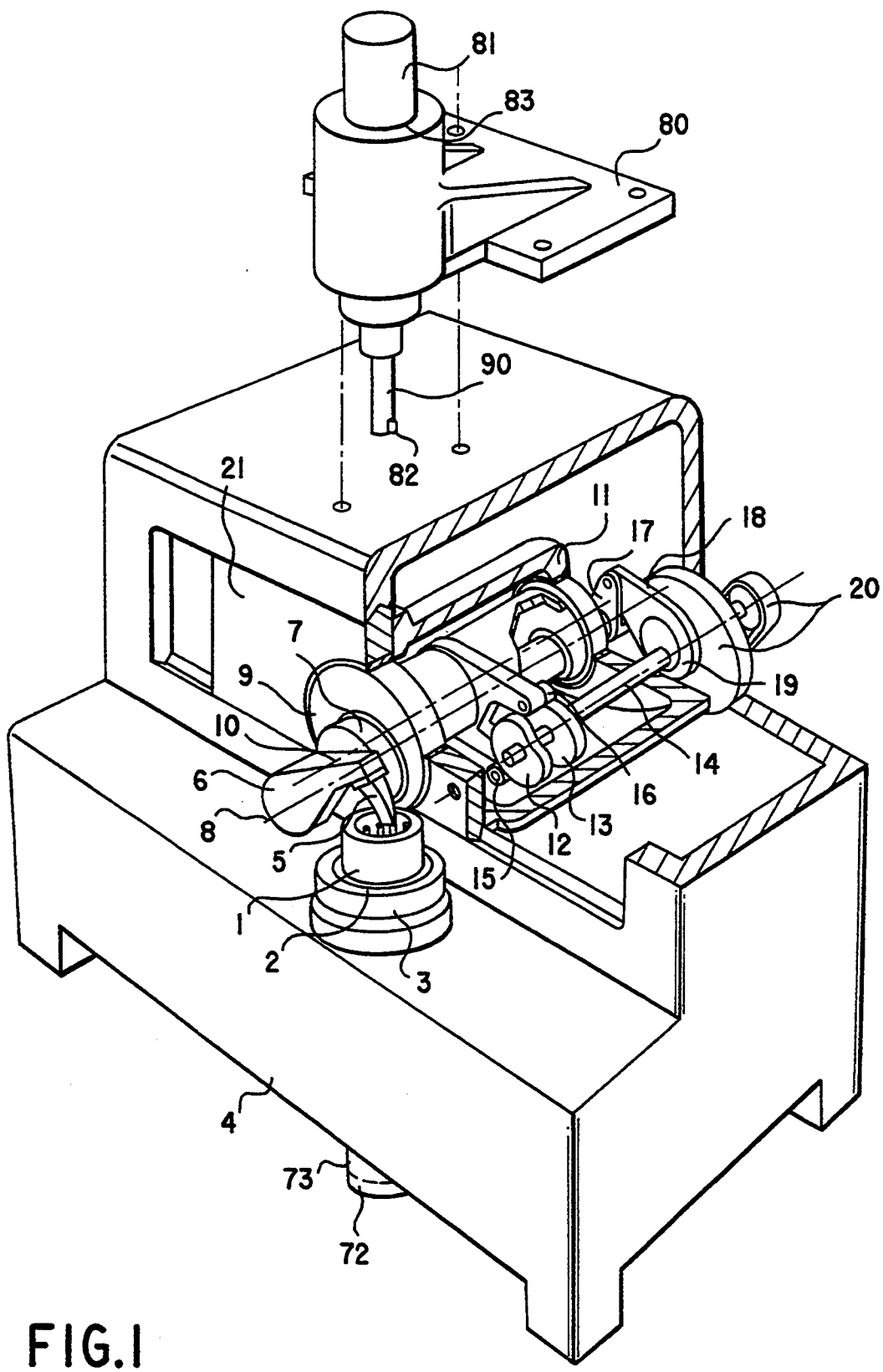
FIG. 1 is a sectioned perspective view of the boring/slotting machine in accordance with the present invention.

FIG. 1 shows sleeve 1 held in collet 2 of work holding spindle 3 which is mounted for both rotation and axial sliding in machine base 4. Cutting tool 5 is secured to an arm 6 extending from cutting spindle 7. Cutting spindle 7 oscillates angularly through an angle of approximately 40 degrees and cutting tool 5 is shown in its uppermost position.

Figure 2:
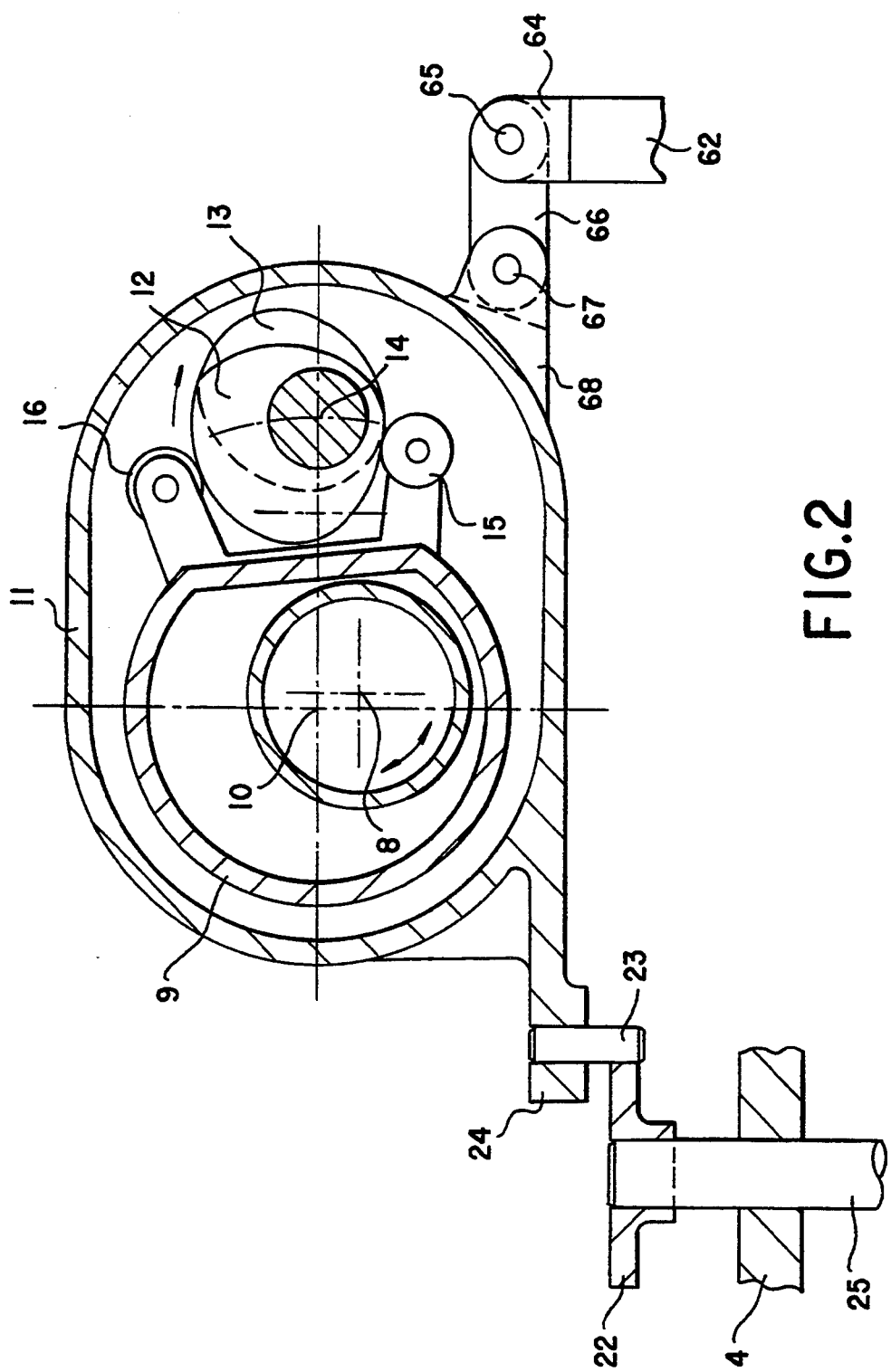
FIG. 2 is a partial sectional elevation view of the machine in FIG. 1 (section plane AA in FIG. 4)

Referring now also to FIG. 2, cutting spindle 7 is journalled for rotation about axis 8 within spindle carrier 9 which is itself journalled for angular oscillation about axis 10 in cutting capsule 11. The typical angular oscillation of spindle carrier 9 is approximately 8 degrees.

The angular oscillation of spindle carrier 9 is controlled by two adjacent cams 12 and 13 mounted on shaft 14 which is also journalled in cutting capsule 11. Cam 12 acts upon roller follower 15 and cam 13 acts upon roller follower 16 journalled on arms extending from spindle carrier 9. Cams 12 and 13 constitute a desmodromic arrangement, whereby angular oscillation of spindle carrier 9 occurs without any appreciable slack movement, and is shown in detail in FIG. 2.

Figure 3:
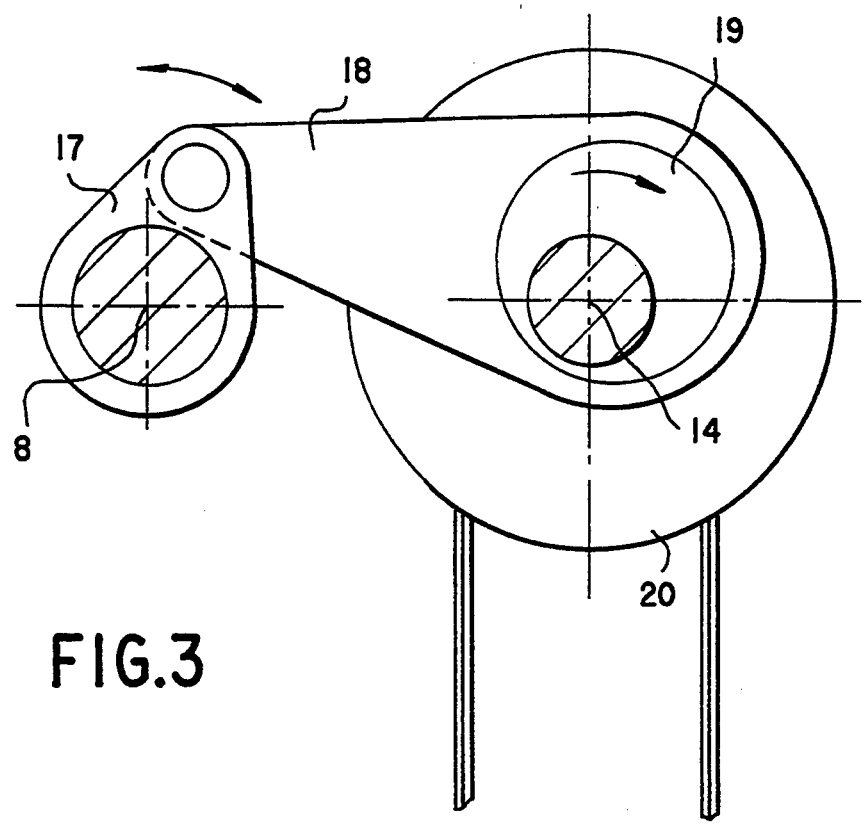
FIG. 3 is a partial sectional elevation view of the machine in FIG. 1 (section plane BB in FIG. 4)

The oscillation of cutting spindle 7 about axis 8 is controlled by lever 17 and connecting rod 18, the latter which is journalled on eccentric 19 mounted on shaft 14. This geometry is shown in detail in FIG. 3. The oscillation of cutting spindle 7 is thus the sum of the motions supplied by eccentric 19 to lever 17 and the oscillation of axis 8 caused by the motion imparted to axis 10 of spindle carrier 9 by desmodromic cams 12 and 13. Shaft 14 carries at its outer extremity fly-wheel and drive pulley arrangement 20.

Cutting capsule 11 is secured to slideway 21 which slides within precision guideways machined within machine base 4. During the operation of the machine, cutting tool 5 reciprocates in a series of alternate downward cutting strokes and return strokes whilst the entire mechanism comprising slideway 21, cutting capsule 11 and all the related mechanism slides progressively to the right (as shown in FIG. 1) so cutting an arcuate slot in sleeve 1. Thereafter slideway 21 retracts to the left an amount slightly in excess of the depth of the arcuate slot, and work holding spindle 3 indexes to a new position. The above cycle is repeated until all the required number of slots have been machined (typically six or eight slots).

Figure 4:
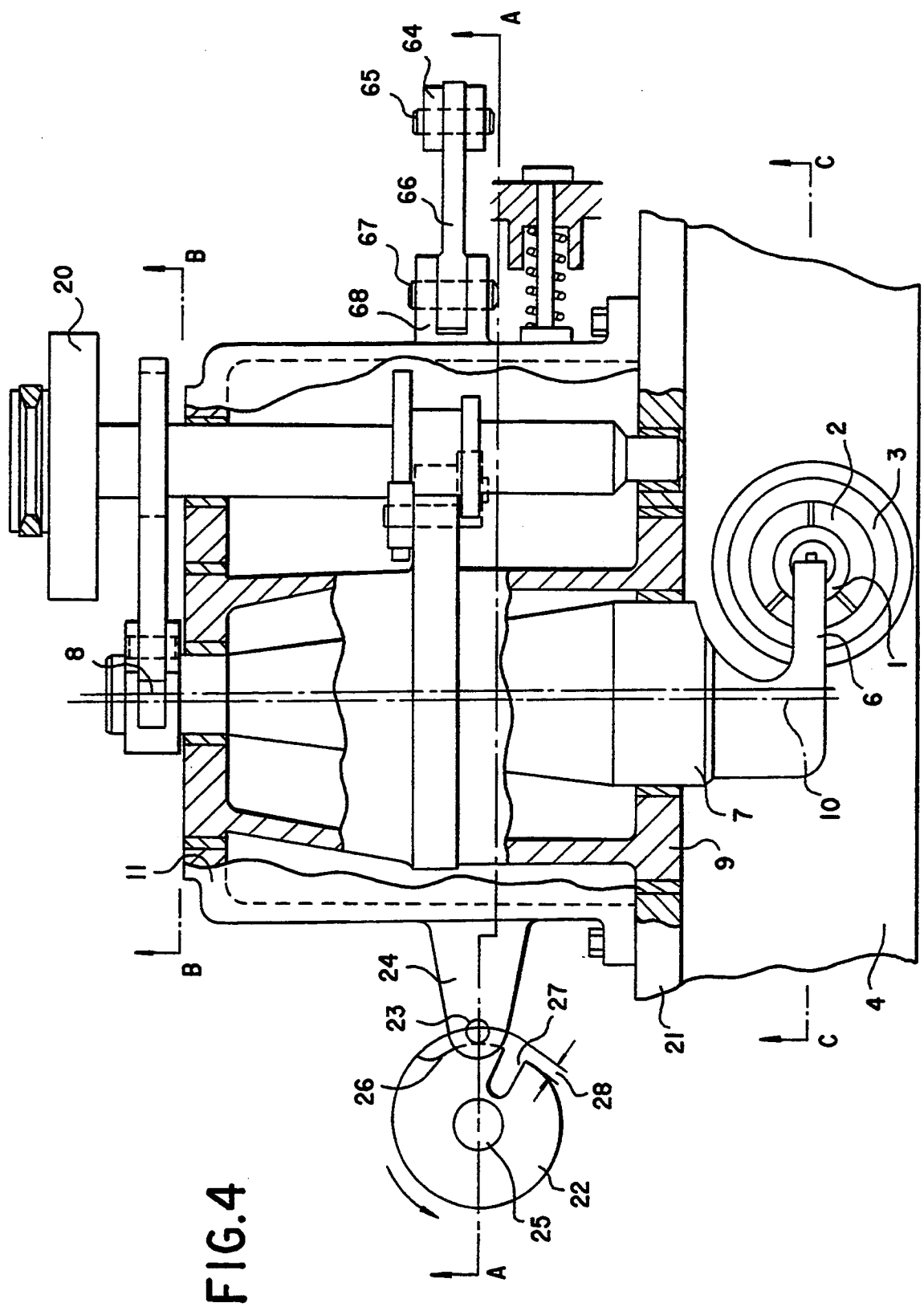
FIG. 4 is a partial sectional plan of the machine in FIG. 1, in the plane containing the axis of the cutting spindle.

Now referring to FIGS. 2 and 4, the progressive movement of slideway 21 and cutting capsule 11 to the right during cutting of the slots is controlled by feed cam 22 mounted on shaft 25 journalled in machine base 4 which reacts upon follower 23 which is secured to arm 24 extending from cutting capsule 11. Feed cam 22 rotates in the direction indicated in FIG. 4 and has, over approximately three quarters of its periphery, a scroll surface extending clockwise between, at one end, a radial slot 27 having a width suitable to accommodate follower 23 and, at the other end, a recessed cylindrical surface 26. The lift of the scroll surface of feed cam 22 has a radial displacement indicated as 28 which is sufficient to move slideway 21 and cutting spindle 7 to the right a distance slightly in excess of the depth of the arcuate slots in sleeve 1, typically about 3 mm.

Figure 5:
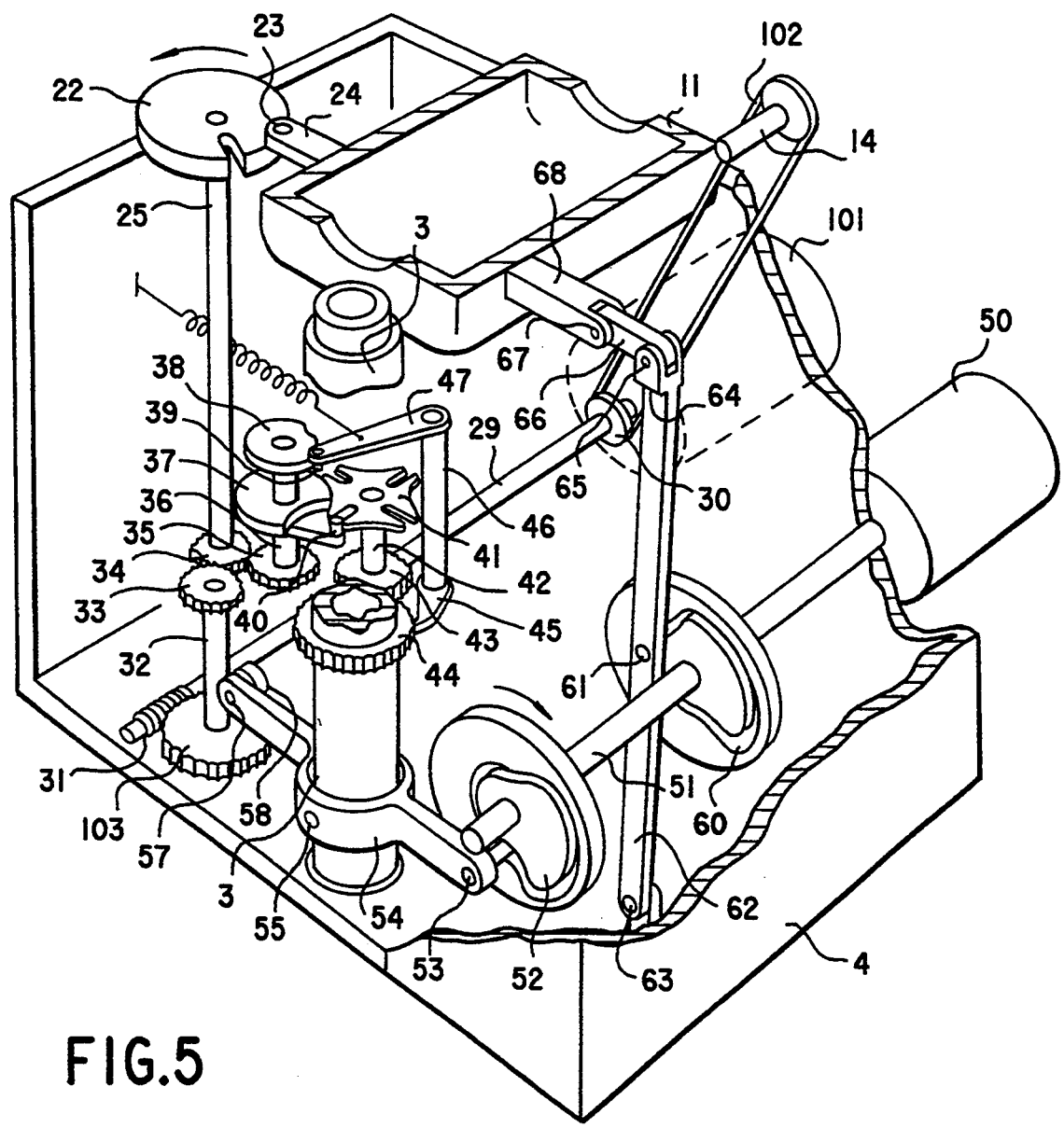
FIG. 5 is a sectioned perspective view of the lower portion of the machine in FIG. 1, showing the mechanism which co-ordinates the motion of the work holding spindle and the cutting capsule.

Now referring to FIG. 5, the mechanism co-ordinating the motions of the work holding spindle 3 and cutting capsule 11 is shown. For reasons of clarity the upper portion of the machine above cutting spindle 7 has been removed. Also work holding spindle 3 has been partly removed in order to expose the index and other mechanisms.

On the rear side of the machine base 4 is mounted main drive motor 101 connected by a coupling to drive shaft 29 which carries at its rear end pulley 30 which drives shaft 14 via belt 102. Drive shaft 29 carries at its front end worm 31 which drives worm wheel 103 mounted on shaft 32.

Journals for these shafts, as for all other shafts in the mechanism to be described, are omitted for the sake of clarity. Shaft 32 carries at its upper end gear 33 which meshes with gear 34 carried on the lower end of shaft 25.

The belt drive ratio between drive shaft 29 and shaft 14 is generally about 1:1 so that, for every revolution of main drive motor 101, cutting spindle 7 reciprocates through one complete downward cutting stroke and following return stroke. Typically about 30 such strokes are required to machine each sleeve slot. Furthermore the gearing ratio between worm 31 and worm wheel 103 is about 40:1 so that only three quarters of a revolution of cam 22 (that is the scroll surface earlier referred to) is required to transmit to follower 23, and hence cutting capsule 11, the full cutting travel needed to machine one slot. Gear 34 drives gear 35 mounted on shaft 36 which carries Geneva drive plate 37 and, still further up the shaft, disc cam 38 engaging pin follower 39. Geneva drive plate 37 has an arm extending therefrom which carries Geneva drive pin 40 which successively engages the four slots of Geneva wheel 4.1 in the conventional manner. Geneva wheel 41 is mounted on shaft 42 which carries at its lower end gear 43 which meshes with master index gear 44 mounted on work holding spindle 3. Note that master index gear 44 serves the dual purpose of providing for the rotation of the work holding spindle, and also for its precision indexing through the engagement of pawl 45 with the teeth of master index gear 44. This pawl is mounted on shaft. 46 having, at its upper end, lever 47 with follower pin 39 at its extremity. A spring urges pawl 45 into engagement in an appropriate tooth of master index gear 44 at all times other than when it is lifted momentarily through the action of the rotation of disc cam 38 and follower pin 39.

The ratio between gear 43 and master index gear 44 is typically 1:2, so that, in the instance shown, if gears 33, 34 and 35 are all of the same diameter, a slot will be machined in sleeve 1 every one eighth of a revolution of work holding spindle 3 so machining an eight slot sleeve. The ratio between gear 43 and master index gear 44 would be 2:3 in the case of a six slot sleeve.

At the instant illustrated in FIG. 4 and in FIG. 5, feed cam 22 has rotated through most of the recessed cylindrical surface 26 during which time slideway 21 has moved to the left to clear cutting tool 5 from the sleeve bore and Geneva mechanism 37–41 has driven the work holding spindle 3 to the next slot position. This retract movement of the slideway 21 is effected by a spring which urges slideway 21 to the left only as far as the position indicated in FIG. 4.

In the case of the last slot of an eight slot sleeve, a counting mechanism (not shown) will stop main drive motor 101 abruptly in such a position that radial slot 27 of feed cam 22 extends radially towards follower 23.

Figure 6:
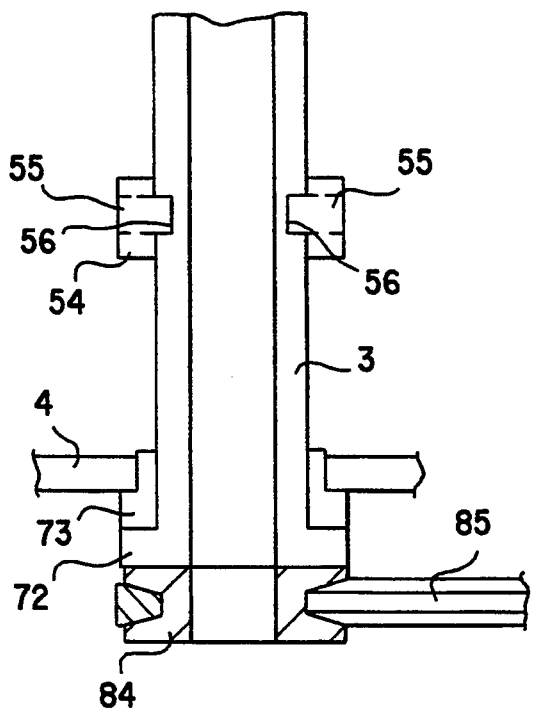
FIG. 6 is a sectional elevation view of the work holding spindle on plane CC in FIG. 4.

At the same instant loader drive motor 50, which incorporates a reduction mechanism, is energised to rotate shaft 51 in the direction shown. Shaft 51 is journalled in machine base 4 and carries, at its remote end from loader drive motor 50, cam 52 which serves to lower and then raise work holding spindle 3 in the manner that will now be described. The track of cam 52 engages follower 53 secured to yoke 54 which loosely surrounds work holding spindle 3 in the manner illustrated in detail FIG. 6. Here it will be seen that pins 55, one on either side, extend radially inwardly to engage groove 56 cut in work holding spindle 3 thus coupling the rise and fall of yoke 54 to work holding spindle 3 while allowing free rotation thereof. Yoke 54 extends beyond work holding spindle 3 and is provided with pivot 57 secured to bracket 58 integral with machine base 4. By this means, the rise and fall of follower 53 is transferred to work holding spindle 3. It will be seen that, in the position of cam 52 illustrated, follower 53 is in its uppermost position but upon further rotation of cam 52 it is driven downwardly hence lowering work holding spindle 3 so that sleeve 1 is now clear of the lower end of cutting tool 5. Such lowering of work holding spindle 3 may occupy approximately 60 degrees rotation of cam 52, whereupon it is required that slideway 21 moves to the left carrying with it cutting spindle 7 and cutting tool 5 so allowing the removal of sleeve 1 from collet 2. This movement is accomplished through the action of cam 60 which, in the position illustrated in FIG. 5, is shown engaging follower 61 at a position on its track of smallest radius which extends around this cam for about 60 degrees. Follower 61 is secured to retract lever 62 which is pivoted to machine base 4 at bracket 63 and extends upwardly in the form of fork 64. Here pin 65 engages link 66 which is itself secured by pin 67 to yoke 68 extending from cutting capsule 11. Thus upon continued rotation of cam 60 cutting capsule 11 is driven to the left as in FIG. 4 and causes follower 23, secured to arm 24 of cutting capsule 11, to enter radial slot 27 of feed cam 22. In this position of slideway 21, cutting tool 5 has been moved a sufficient distance to clear the outside diameter of sleeve 1 and hence allow its removal from collet 2 by a collet operating mechanism of a conventional type actuated by the rotation of shaft 51 (not shown). Loader drive motor 50 is arrested while the loading of the next sleeve 1 is performed by the operator, whereupon loader drive motor 50 is restarted to again move slideway 21 to the right under the action of the cam track of cam 60 so restoring the slideway to its position ready to commence the first cut of the sleeve and thereafter raising work holding spindle 3 to its original height through the action of cam 52 in a reverse of the order of events described earlier. It is important that work holding spindle 3 is accurately and rigidly supported in its uppermost position and to this end it is provided with a flange 72 which bears on flanged bearing 73 secured in machine base 4 (refer to FIG. 6). Pins 55 exert considerable upward force on work holding spindle 3 during cutting in order to assure rigid support thereof. The machine is now ready to commence the machining of the next component.

According to the invention, the slotting machine shown in FIG. 1 incorporates a boring assembly 80 which includes a sliding quill 81 whose axis is machined precisely in line with the bearings supporting work holding spindle 3 in machine base 4. Quill 81, which incorporates non-rotating boring bar 90 on which boring tool 82 is mounted, is traversed vertically through the cylindrical guideway 83 provided in boring assembly 80. The mechanism for traversing quill 81 is not illustrated as such guideway-traversing assemblies are readily available as a standard item. It is preferred that during the boring operation workholding spindle 3 is rotated as, for example, by extending flanged bearing 73 (see FIG. 6) to incorporate vee pulley 84 driven by vee belt 85 from a motor (not shown). By this means, absolute concentricity of the bore produced by the boring tool 82 with respect to the centre of the array of slots formed in sleeve 1 is assured.

In an alternate application of the process, it will suffice to arrange that quill 81 incorporates, in place of the non-rotating boring bar 90, a rotating boring bar (not shown) on which boring tool 82 is mounted, and that the workholding spindle 3 is not rotated during the boring operation. By this means a very precise diameter bore may be machined in sleeve 1, but with some slight risk of a small order of eccentricity resulting from the non-coaxiallity of guideway 83, in boring assembly 80, and the spindle journals of work holding spindle 3, in machine base 4. Of course the same slight eccentricity, if it occurred randomly, would result in this alternate application of the process actually being more accurate in respect of the diameter of the bore than the earlier described method in which the work holding spindle rotates.

Alternatively both boring tool 82 and work holding spindle 3 may be rotated at different speeds to each other so producing a bore which will, on average, be concentric with the centre of the slot pattern but may have slight alternations of diameter along the length of the sleeve bore, later removed by the subsequent honing, diamond sizing or lapping process.

Figure 7:
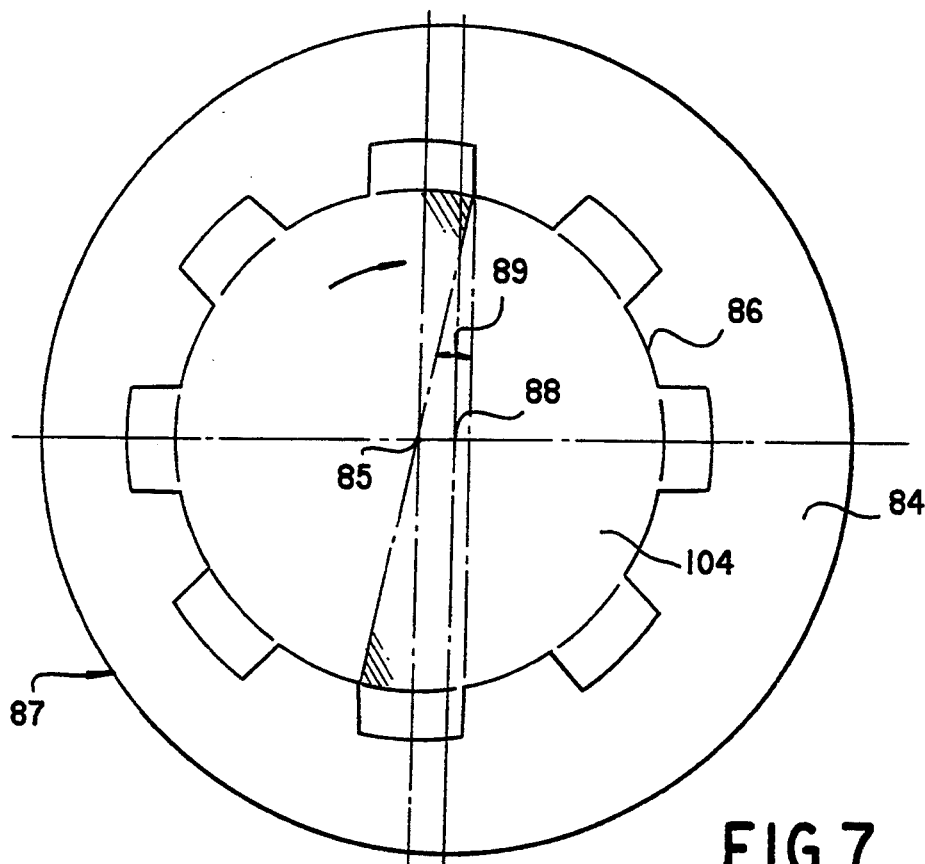
FIG. 7 shows a cross section through a sleeve manufactured according to the present invention.
Figure 8:
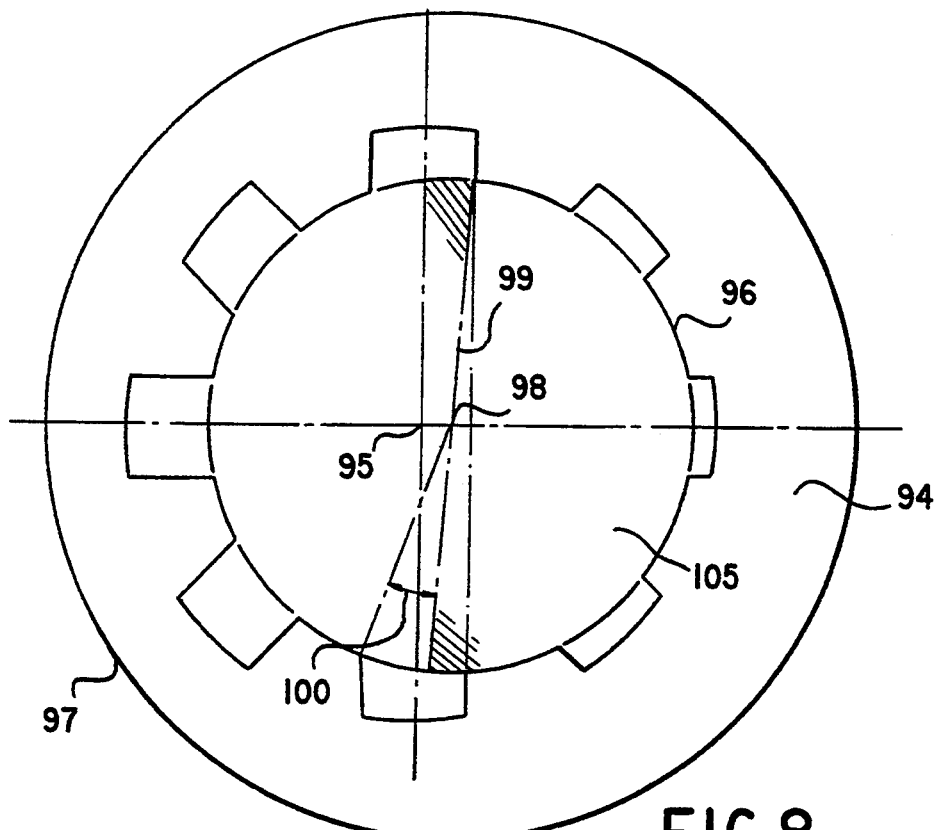
FIG. 8 shows a cross section through a sleeve manufactured by earlier referred to prior art methods.

The gains in accuracy resulting from this method are illustrated in FIGS. 7 and 8.

FIG. 7 shows a simple eight slot sleeve 84 made according to the method just described wherein an array of eight slots of equal width are spaced at equal angles around centre 85 which is coincident with the axis of rotation of work holding spindle 3 during the boring operation, and hence the centre of the cylindrical surface of bore 86. The exterior cylindrical surface 87 of the sleeve may have a centre 88 which is eccentric to centre 85, as indicated, but this will not affect the operation of the sleeve in the equal sharing of oil flow between the eight edges which close simultaneously, for example, during clockwise rotation of the input shaft 104 within sleeve 84. Angle 89 indicates the equal subtended angle of opposing sleeve slot edges of such an arrangement during a right turn.

Referring now to FIG. 8 which shows sleeve 94 made by prior art methods or indeed a machine such as illustrated in FIG. 1, but without the use of the boring process according to the present invention. The collet of the machine again inevitably has some eccentricity indicated by the centre 95 of the array of slots not being coincident with the axis 98 of the sleeve, as measured with respect to its outside diameter 97. However the sleeve is now hardened and the bore finish machined by a grinding method locating from the outside diameter 97. The centre 98 of finished sleeve bore 96 is now eccentric with respect to the centre 95 of the array of slots. Now considering the operation of such a sleeve in service in conjunction with an input shaft 105 which has opposing edges lying along diameter 99 which passes through centre 98. It will be seen that an angular lag occurs between the closing of the upper edge and the lower opposing edge, which has a magnitude illustrated by angle 100, so resulting in uneven distribution of the oil during final close-off of the valve.

Of course much more complicated arrays of slots may be used in sleeves of various types, but nevertheless the same situation will arise unless maximum precision is achieved in the angular spacing of slots with respect to the finished sleeve bore 9.6.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A method for machining an angularly disposed array of parallel longitudinally extending slots in a bore of a component comprising the steps of gripping said component in a gripping means of a workholding device mounted to an indexable workholding spindle, machining said bore of said component, cutting said array of slots in said bore by a series of progressively deeper cutting strokes of a cutting tool, the cutting of each slot being followed by indexation of said workholding spindle, said cutting of said array of slots being carried out while the component remains gripped in said gripping means in the same location and orientation as during said machining of said bore to thereby maintain the center of the array of said cut slots collinear with the axis of said bore subsequent to machining irrespective of the location and orientation of the component in the workholding device.

2. A method as claimed in claim 1 wherein said machining is followed by said cutting.

3. A method as claimed in claim 1 wherein said cutting is followed by said machining.

4. A method as claimed in claim 1 wherein the cut and machined bore is finished by a finishing process guided by, and therefore substantially coaxial with, the prior cut and machined bore.

5. A method as claimed in claim 4 wherein the finishing process is selected from honing, diamond sizing and lapping.

6. A method as claimed in claim 1 wherein the component is rotated during said machining.

7. A method as claimed in claim 1 wherein the component is not rotated during said machining.

8. Apparatus for machining an angularly disposed array of parallel longitudinally extending slots in a bore of a component, said apparatus comprising means for gripping said component in a workholding device mounted to an indexable workholding spindle, boring means for boring the bore of said component while gripped by said gripping means and slotting means for cutting an array of slots within the bore, wherein said boring means and said slotting means are operable while the component is continuously gripped within the gripping means to thereby maintain the center of the array of said cut slots collinear with the axis of said bore subsequent to the boring by the boring means irrespective of the location and orientation of the component in the workholding device.

9. Apparatus as claimed in claim 8 wherein the work holding spindle is rotatable during said machining and said boring means comprises a non-rotatable boring bar.

10. Apparatus as claimed in claim 8 wherein the workholding spindle is non-rotatable during said machining and said boring means comprises a rotatable boring bar.

11. Apparatus as claimed in claim 8 wherein the workholding spindle is rotatable during said machining and the boring means comprises a rotatable boring bar.

12. Apparatus as claimed in claim 8 comprising a sliding quill for holding said boring means, said quill having its sliding axis aligned with the axis of the workholding spindle.

13. Apparatus as claimed in claim 8 comprising a cutting tool mounted on a cutting spindle, the rotational axis of said cutting spindle being substantially perpendicular to and mutually offset from a rotational axis of said workholding spindle, said cutting spindle pivotally supported for angular reciprocation in a cutting capsule wherein said axis of said cutting spindle is movable towards said axis of said workholding spindle during each cutting stroke and away from said axis of said workholding spindle during each return stroke such that the path of travel of a cutting edge of the cutting tool is different during cutting and return strokes thereby effecting cutting tool relieving, first cutting capsule traversing means for traversing said cutting capsule towards said axis of said workholding spindle to effect cutting tool infeed to some predetermined depth within the bore of the component and thereafter traversing said cutting capsule away from said axis of said workholding spindle after the machining of each slot, second cutting capsule traversing means for traversing said cutting capsule laterally away from the axis of the workholding spindle a sufficient distance to permit insertion of said boring means within said component.

14. An apparatus as claimed in claim 13 wherein said boring means is arranged substantially coaxially with said axis of said workholding spindle.

15. A rotary valve sleeve produced by the process of claim 1, said sleeve comprising an array of blind-ended slots circumferentially spaced within a bore of the sleeve, characterised in that each slot is formed by progressively deeper cutting strokes of a cutting tool and wherein the array of slots is formed with essentially zero eccentricity with respect to the axis of the bore irrespective of any eccentricity of the axis of the bore relative to the perimeter of the sleeve.

16. A method for machining an angularly disposed array of parallel longitudinally extending slots in a bore of a component comprising the steps of gripping said component in a gripping means of a workholding device mounted to an indexable workholding spindle, cutting said array of slots in said bore by a series of progressively deeper cutting strokes of a cutting tool, the cutting of each slot being followed by indexation of said workholding spindle, further machining said bore of said component, said machining of said bore being carried out while the component remains gripped in said gripping means in the same location and orientation as during said cutting of said array of slots to thereby maintain the center of the array of said cut slots collinear with the axis of said bore subsequent to machining irrespective of the location and orientation of the component in the workholding device.

* * * * *